(12) United States Patent
Ackley et al.

(10) Patent No.: US 9,911,299 B2
(45) Date of Patent: *Mar. 6, 2018

(54) SAFETY SYSTEM AND METHOD

(71) Applicant: Hand Held Products, Inc., Fort Mill, SC (US)

(72) Inventors: H. Sprague Ackley, Seattle, WA (US); Jean-Luc Courtemanche, Latapie (FR)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/422,973

(22) Filed: Feb. 2, 2017

(65) Prior Publication Data

US 2017/0206765 A1 Jul. 20, 2017

Related U.S. Application Data

(63) Continuation of application No. 14/578,627, filed on Dec. 22, 2014, now Pat. No. 9,564,035.

(51) Int. Cl.
*G08B 5/22* (2006.01)
*G08B 21/02* (2006.01)
*G08B 25/00* (2006.01)

(52) U.S. Cl.
CPC ............. *G08B 21/02* (2013.01); *G08B 25/00* (2013.01)

(58) Field of Classification Search
CPC ..... G08B 25/00; G08B 21/02; H04W 88/022; H04W 88/185; H04L 15/26
See application file for complete search history.

(56) References Cited

U.S. PATENT DOCUMENTS

| | | | | |
|---|---|---|---|---|
| 6,028,514 A | * | 2/2000 | Lemelson | G08B 21/0211 128/903 |
| 8,494,481 B1 | * | 7/2013 | Bacco | G08B 25/005 340/571 |
| 8,688,146 B2 | * | 4/2014 | Grube | H04W 8/22 455/456.3 |
| 2008/0129496 A1 | * | 6/2008 | Koblasz | G08B 21/0261 340/540 |
| 2013/0040661 A1 | * | 2/2013 | Grube | H04W 8/22 455/456.3 |
| 2013/0089213 A1 | * | 4/2013 | Heine | H04R 3/02 381/73.1 |

(Continued)

FOREIGN PATENT DOCUMENTS

EP 1265166 A2 * 12/2002 ............. G06Q 30/02

*Primary Examiner* — Tesfaldet Bocure
(74) *Attorney, Agent, or Firm* — Additon, Higgins & Pendleton, P.A.

(57) ABSTRACT

A system and method are described. The system utilizes data entry devices commonly found in some workplaces, such as warehouses, to generate an emergency signal. The emergency signal is used to generate an emergency response. In one embodiment, an emergency sign with a printed emergency symbol may be scanned using a network-connected barcode scanner to generate the emergency signal. In another embodiment, a user may utter an emergency speech input into a network-connected speech recognition device to generate the emergency signal. The system and method may expand and improve safety in a workplace by offering a more convenient way to summon help.

20 Claims, 2 Drawing Sheets

(56) References Cited

U.S. PATENT DOCUMENTS

| | | | |
|---|---|---|---|
| 2013/0252571 A1* | 9/2013 | Lee | H04W 4/22 |
| | | | 455/404.1 |
| 2013/0339019 A1* | 12/2013 | Giancarlo | G10L 15/04 |
| | | | 704/251 |
| 2014/0004814 A1* | 1/2014 | Elghazzawi | H04W 4/02 |
| | | | 455/404.2 |
| 2014/0194082 A1* | 7/2014 | Wingert | H04M 3/42221 |
| | | | 455/404.1 |
| 2014/0213304 A1* | 7/2014 | Beckett | H04W 4/021 |
| | | | 455/456.6 |
| 2014/0239057 A1* | 8/2014 | Galvin, Jr. | H04M 1/72566 |
| | | | 235/375 |
| 2014/0253326 A1* | 9/2014 | Cho | H04W 4/22 |
| | | | 340/539.13 |
| 2015/0012152 A1* | 1/2015 | Ricci | G06F 9/54 |
| | | | 701/2 |
| 2015/0302539 A1* | 10/2015 | Mazar | G08B 21/0211 |
| | | | 705/3 |

* cited by examiner

SAFETY SYSTEM AND METHOD

CROSS-REFERENCE TO RELATED APPLICATION

The present application claims the benefit of U.S. patent application Ser. No. 14/578,627 for a Safety System and Method filed Dec. 22, 2014 (and published Jun. 23, 2016 as U.S. Patent Publication No. 2016/0180678), now U.S. Pat. No. 9,564,035, which issued on Feb. 7, 2017. Each of the foregoing patent application, patent publication, and patent is hereby incorporated by reference in its entirety.

FIELD OF THE INVENTION

The present invention relates to safety systems and more specifically to a safety system with an emergency signal generated by scanning an emergency symbol with a barcode scanner, or recognizing an emergency speech input using a speech recognition device.

BACKGROUND

Safety is a primary concern in all workplaces. Summoning immediate assistance to a precise location when an emergency occurs is important. In many facilities (e.g., warehouses), workers wear gloves or otherwise have their hands engaged, making it difficult to use a mobile phone to call for assistance. Some workers do not have mobile phones, and in some facilities, mobile phones are prohibited. In these situations, however, the workers may have easy access to barcode scanners and/or speech recognition devices. Therefore, a need exists for a safety system that uses barcode scanners or speech recognition devices to summon help in case of an emergency.

SUMMARY

Accordingly, in one aspect, the present invention embraces a safety system. The safety system includes an emergency sign, a barcode scanner, and a host computer. The emergency sign includes a readable message and an emergency symbol. The barcode scanner is communicatively coupled to a computer network and configured to decode the emergency symbol. To summon an emergency response, the barcode scanner scans the emergency symbol to generate an emergency signal. A host computer, communicatively coupled to the computer network, receives the emergency signal and generates an emergency response.

In an exemplary embodiment of the safety system, the emergency signal comprises an emergency location indicator (ELI). In various embodiments, the ELI may include an entry in a lookup table, a pole-location number, a grid location address, or a global positioning system (GPS) set of coordinates.

In other exemplary embodiments of the safety system, the emergency response may include an email, a text message, an audible alarm, or a voice message sent via an auto-dialed phone connection to an emergency phone number.

In another exemplary embodiment of the safety system, the emergency response is transmitted to a facility security system and is one of a plurality of possible inputs to the facility security system.

In another exemplary embodiment of the safety system, the readable message on the emergency sign includes the word "emergency."

In another exemplary embodiment of the safety system, the network is an IEEE 802.11 wireless network.

In another aspect, the present invention embraces a method for generating an emergency response using an emergency symbol. The method begins with the step of locating an emergency sign having an emergency symbol. The emergency symbol is scanned using a barcode scanner. The scan results in the generation of an emergency signal by the barcode scanner. The emergency signal is transmitted by the barcode scanner to a host computer via a computer network, to which the barcode scanner and host computer are communicatively coupled. The host computer is configured by emergency software to interpret the emergency signal and generate an emergency response.

In an exemplary embodiment of the method, the emergency sign includes a readable message.

In another exemplary embodiment of the method, the emergency signal comprises information regarding the emergency sign's location.

In possible exemplary embodiments of the method, the emergency response comprises a text message, email, and/or a telephone call.

In another exemplary embodiment of the method, the barcode scanner is handheld and wireless.

In another aspect, the present invention embraces a method for generating an emergency response using speech input. The speech input method begins with the step of receiving an emergency speech input using a speech recognition device communicatively coupled to a network. The emergency speech input is processed to generate an emergency signal. The emergency signal is transmitted from the speech recognition device to a host computer communicatively coupled to the network. Emergency software running on the host computer configures the host computer to interpret the emergency signal and generate an emergency response.

In an exemplary embodiment of the method using speech input, the emergency speech input includes an emergency word and a location phrase.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces a safety system for a workplace (e.g., warehouse) that makes use of data entry equipment, such as barcode scanners and/or speech (i.e., voice) recognition devices. In warehouse environments, workers may need to immediately report an event (e.g., emergency, injury, assistance needed, etc.) but may not have access to a communication device (e.g., mobile phone). In some cases, they may have a communication device but using it is prohibited or would be inconvenient (e.g., wearing gloves, carrying an item, driving a vehicle, etc.). In other cases, making a call is difficult but using a communication device to decode a printed symbol is easy. Data entry devices (e.g., wearable barcode scanners, voice-recognition headsets) have been devised to help a worker communicate messages to a host computer in these conditions. As a result, the use of these data entry devices to summon an emergency response could facilitate improved safety in the workplace.

In one embodiment, the present invention embraces a safety system and method for generating an emergency response using a network-connected barcode scanner and an emergency sign.

An emergency sign may use printed emergency symbols and printed readable messages to convey emergency information. The readable messages may indicate the purpose of the sign and may provide instructions for its use, while the emergency symbol (e.g., barcode) may be encoded with an alarm message and an emergency location indicator. The alarm message may include instructions for triggering and/or executing an emergency response, while the emergency location indicator may provide information regarding the location of the emergency sign (i.e., the location of the emergency). When scanned with a barcode reader (i.e., scanner), the emergency symbol may be decoded to produce an emergency signal that includes both the alarm message and the emergency location indicator. This emergency signal may then be communicated to other devices via a network. As a result, emergency signs placed throughout the workplace may be used to generate an emergency signal that can be used to generate an emergency response.

Figure 1:
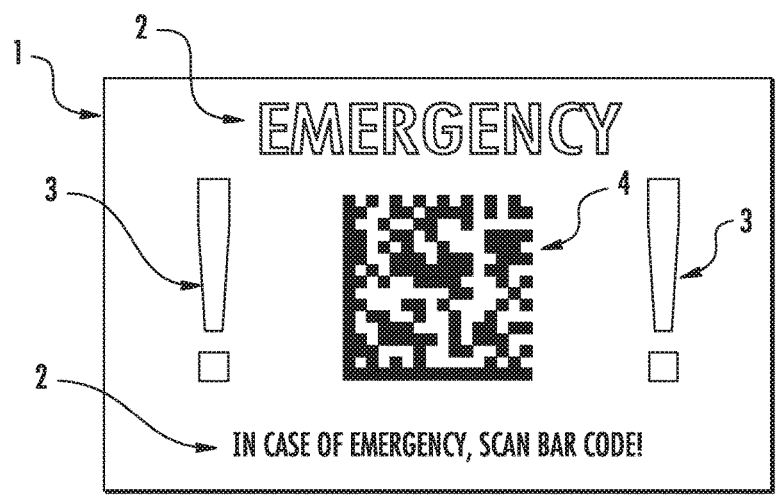
FIG. 1 graphically depicts an exemplary embodiment of an emergency sign.

An exemplary emergency sign is shown in FIG. 1. The emergency sign 1 has readable messages 2,3 and at least one emergency symbol 4 encoded to generate the emergency signal when scanned with a barcode scanner. The emergency symbol 4 in FIG. 1 is a Data Matrix but other encoding methods could be used.

The readable message 2,3 may be a text readable message 2 or may be a graphical message (i.e., icon) 3. In the emergency sign in FIG. 1, the text readable message 2 conveys that the sign is for emergency use (i.e., "Emergency"). Another text readable message is included to convey the instructions for the sign's use (i.e., "In case of Emergency, scan barcode!").

The graphical message 3 on the emergency sign conveys a general message for alert/emergency (e.g., "!"). Other, more specific, graphical messages are possible. For example, a graphical message could be included on an emergency sign to indicate a specific emergency (e.g., fire, shock, slip, etc.). In this way, different signs could be created for different emergencies. In addition, these signs could be located in areas where the specific emergency is most likely to happen (e.g., a trip emergency sign located by stairs).

The emergency symbol 4 is used to encode emergency information. Typically, one emergency symbol 4 is used per emergency sign 1 but in some embodiments, more than one emergency symbol may be included on an emergency sign to expand the information that may be conveyed by the emergency sign 1 (e.g., symbols for different types of emergencies on the same emergency sign).

The emergency symbol 4 is typically a printed barcode. Here the term "barcode" is used in it most general sense to mean a visually encoded message printed or displayed for reading by a device (i.e., barcode reader, barcode scanner, indicia reader, scanner, etc.) configured to read (i.e., decode, scan, etc.) the barcode. The barcode may be black-and-white, gray-scale, or color. The barcode may be linear (one-dimensional, 1D) or two-dimensional (2D). Barcodes could be encoded using a proprietary coding system, including alphanumeric and/or symbology-specific characters (e.g., FNC3 in Code 128). Alternatively, the barcodes could be encoded using a recognized encoding standard. An example of a standard encoding scheme includes an ISO 15434 compliant header and a data identifier (DI). Here, one DI could be used for indicating an emergency symbol, while another DI could be used for an emergency location indicator. Alternatively, an emergency symbol could be encoded using Automatic Identification and Mobility (AIM) Extended Channel Interpretations (ECI) methodologies. These symbols may be registered with AIM and encoded with an alarm message and an emergency location indicator. In any case, the emergency symbol may be scanned to produce an emergency signal that includes an emergency location indicator and an alarm message.

The emergency location indicator (ELI) gives the location of the emergency sign and may take different forms. In one embodiment, the ELI is an item in a look-up table (e.g., a reference number associated with a position in the workplace). In another possible embodiment, the ELI is a pole-location number. In another possible embodiment, the ELI is a grid location address (e.g., north-south lines denoted alphabetically and east-west lines denoted numerically).

The alarm message provides may trigger an emergency response. For example, the alarm message may trigger an audible alarm (e.g., bell, whistle, horn, siren, etc.) or a visual alarm (e.g., flashing light). The alarm message may also trigger an event in another safety system (e.g., facility security system, fire alarm system, etc.) or other facility system (e.g., phone system). The alarm message may trigger a host computer, running emergency software, to perform a process or function (e.g., call a phone number, email, or text message). Besides serving as a trigger, the alarm message may also convey information. For example, the alarm message may convey information regarding the emergency (e.g., type of emergency). In some possible embodiments, multiple alarm messages may be encoded in the same emergency symbol to convey different pieces of information or the same information in different formats.

Figure 2:
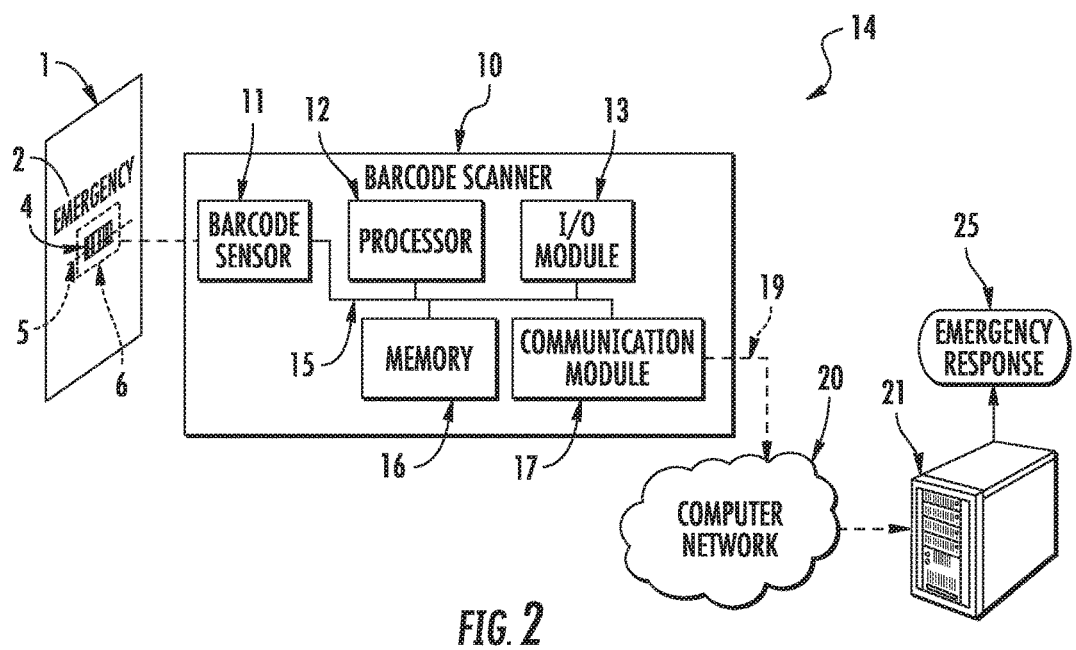
FIG. 2 graphically depicts a block diagram of an exemplary safety system.

An exemplary safety system 14 using an emergency sign 1 is shown in FIG. 2. To generate an emergency signal, the emergency sign 1 is scanned by a barcode scanner 10. The barcode scanner 10 transmits the emergency signal 19 via a computer network 20. A host computer 21 communicatively coupled to the computer network 20 is configured to receive the emergency signal 19, containing emergency information including the type of emergency and the ELI. The host computer 21 may be any computing device with a processor and memory (e.g., mobile computing device, server, security system etc.) that can be configured by software or firmware to perform various functions. Typically, the host computer 21 runs emergency software that monitors the network for an emergency signal. If an emergency signal is detected then, then the host computer 21 is configured to generate an emergency response 25.

The details of the emergency response depend on the workplace and the application. In one possible embodiment, the emergency response is an email (e.g., email to a supervisor, emergency staff, outside emergency agency, etc.). In another possible embodiment, the emergency response is a text message (e.g., text message to a supervisor, emergency staff, outside emergency agency, etc.). In still another possible embodiment, the emergency response is an audible or visible alarm. In another possible embodiment, the emergency response is a voice message, and the voice message may be communicated via an auto-dialed telephone connection (e.g., a 911 call). In still another possible embodiment, the emergency response is an alarm signal for another safety or security system. For example, the emergency response could be one of a plurality of possible alarm inputs to a facility security system with many different alarm sensors. Thus, the safety system could supplement other alarm systems in a cost efficient way.

The barcode scanner 10 could be a single purposed device dedicated to barcode scanning or could be a general purpose mobile computing device (MCD) configured by software to scan barcodes using an integrated camera. An exemplary barcode scanner for a safety system 14 is shown in FIG. 2. Here, the barcode scanner 10 includes a barcode sensor 11 for sensing an emergency symbol 4. The barcode sensor 11 may use a variety of techniques to sense the emergency symbol 4.

In one possible embodiment, the barcode sensor 11 includes a laser scanner for scanning a laser across a field of view 6. Here a collimated beam of laser light (e.g., 630-680 nanometer wavelength) is swept back and forth along a scan-line 5 aligned with the emergency symbol (i.e., barcode) 4. As the light beam encounters the light and dark areas of the barcode 4, it is reflected back towards the barcode sensor 11 differently for each area. The light areas of the barcode reflect more than the dark areas. The reflected light is captured and detected by a light detector (e.g., photodiode) in the barcode sensor 11. The light detector converts the reflected light into a scanned-barcode signal. The scanned-barcode signal may be an electronic signal with a modulated amplitude corresponding to the barcode pattern. This modulated signal may be converted into decoded data by a processor 12 (e.g., one or more controller, digital signal processor (DSP), application specific integrated circuit (ASIC), programmable gate array (PGA), and/or programmable logic controller (PLC)) communicatively coupled to the barcode sensor 11.

In another possible embodiment, the barcode sensor 11 includes an image sensor (e.g., CCD, CMOS sensor, etc.) for capturing images of a field of view 6. To scan a barcode 4, the field of view 6 of the imager is positioned to view the barcode 4 and an image is captured with the image sensor. The processor 12 communicatively coupled to the barcode sensor 11 converts the image of the barcode into decoded data (i.e., an emergency signal).

The exemplary barcode scanner 10 also includes a memory 16 (e.g., read-only memory (ROM), flash memory, a hard-drive, etc.) that stores information. The stored information may include a processor-executable software program for decoding the barcode 4. The processor 12 may access the memory 16 to execute the steps of a decoding program for decoding the emergency symbol 4.

The decoding software program configures the processor 12 to receive the barcode information from the barcode sensor 11 and convert the scanned-barcode into an emergency signal, which is typically a digital signal with information regarding the type of emergency and the location of the emergency sign (i.e., ELI).

In some embodiments, the barcode scanner includes an input/output (I/O) module. The I/O module 13 (e.g., user interface) may display the decoded information (e.g., visually and/or auditory).

The subsystems in the barcode scanner 10 are electrically connected via a couplers (e.g., wires, traces, etc.) to form an interconnection subsystem 15. The interconnection system 15 may include power buses or lines, data buses, instruction buses, address buses, etc., which allow operation of the modules/subsystems and the interaction there between.

The barcode scanner 10 is communicatively connected to a computer network 20 via a wired or wireless data link 19 (e.g., IEEE 802.11). A host computer 21 is also communicatively couple to the computer network 20. This data link 19 may be accessed by a communication module 17 integrated with the barcode scanner 10. In a wireless configuration, the communication module may communicate with a host device over the network via a variety of communication protocols (e.g., WI-FI®, BLUETOOTH®, CDMA, TDMA, or GSM). In some embodiments, the barcode scanner 10 may incorporate a cellular telephone module to communicate over a cellular network as described in U.S. Pat. No. 6,212,401, which is incorporated in its entirety herein by reference.

Figure 3:
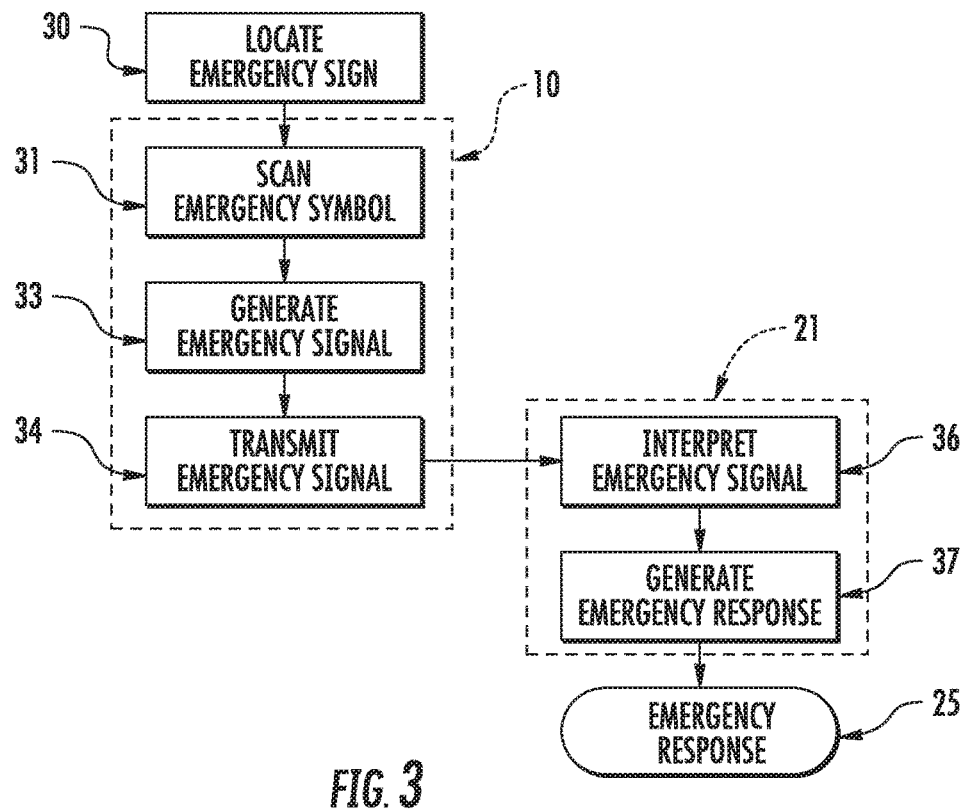
FIG. 3 depicts a flow chart of a method for generating an emergency response using a barcode.

An exemplary method generating an emergency response with an emergency symbol is shown in FIG. 3. An emergency sign 1 is located 30. The signs may be conveniently located throughout the workplace and/or located in areas of high risk for emergency. Each emergency sign may have a unique emergency symbol encoded with an emergency location indicator (ELI) that indicates the location of the sign. A worker scans the emergency symbol 31 with a barcode scanner 10. The barcode scanner 10 reads/decodes the emergency symbol to generate an emergency signal 33. The emergency signal may summon help and/or provide information regarding the emergency and the location of the emergency. The emergency signal is transmitted 34 by the barcode scanner 10 that is communicatively coupled to a computer network (e.g., Wi-Fi network). A host computer 21 also connected to the computer network receives the emergency signal and is configured by emergency software to interpret the emergency signal and generate an emergency response 37. The emergency response 25 may take many forms as described previously.

Besides warehouse environments, it is envisioned that this invention could operate in other environments (e.g., outside a facility, at a construction site, etc.). In one possible embodiment of an outside safety system, a worker's mobile device (e.g., smartphone, tablet, etc.) could read an emergency symbol printed on an emergency sign at a construction site to generate an emergency signal. Here, either the emergency symbol or the mobile device's GPS could provide location information for the emergency signal.

Public safety is also within the envisioned scope of this invention. For example, emergency signs placed in public areas (e.g., near sidewalks, transit stations, etc.) could provide access to an emergency symbol. A user could scan the emergency symbol with a mobile device (e.g., smartphone, tablet, etc.) to generate an emergency signal and summon help.

Besides security and safety, it is envisioned that this system could announce other events (e.g., a big sales or an important shipment). In this way, the invention embraces a response system to generate a predetermined response using a printed response symbol (e.g., barcode). Here a user could locate a response sign displaying a printed response symbol. The user could scan the response symbol with a network-connected barcode scanner to generate a response signal. The response signal could be transmitted from the barcode scanner to a host computer that is also communicatively coupled to the network. The host computer, running response software, could be configured to interpret the response signal and generate a response (e.g., bell, whistle, etc.).

Figure 4:
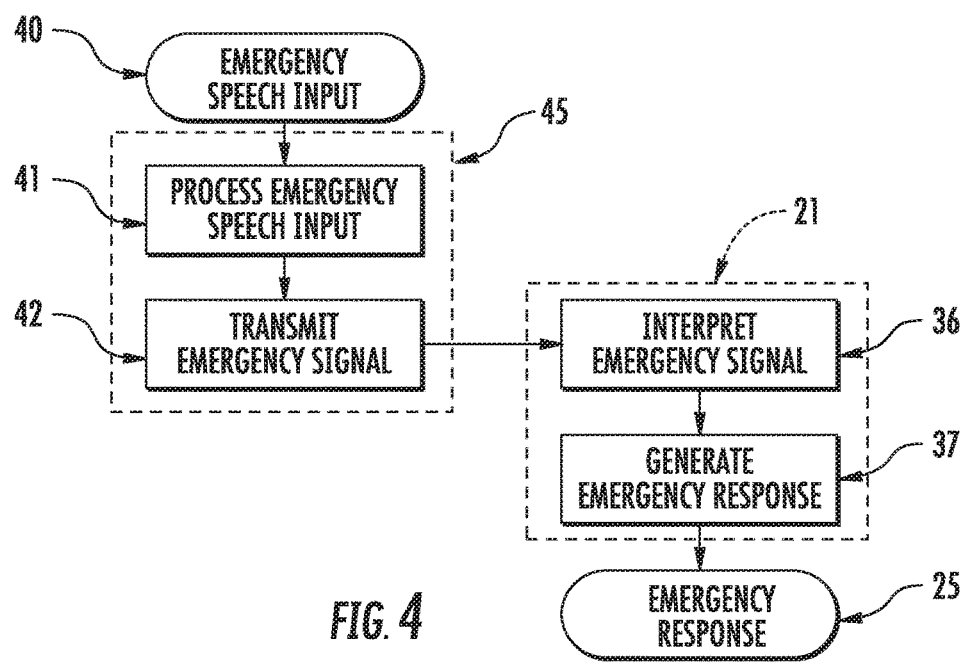
FIG. 4 depicts a flow chart of a method for generating an emergency response using a speech input.

Another workplace data-entry device that could be used for a safety system is a voice-entry device (e.g., speech-recognition device, speech-recognition headset, etc.). An exemplary method for generating an emergency response using a speech recognition device communicatively coupled to a network is shown in FIG. 4. Here the speech recognition device 45 receives an emergency speech input 40. As emergency speech input, a worker could say an emergency word and some recognized location phrase. For example, a worker in an emergency at warehouse location E27 could speak, "Emergency E 2 7" into a speech recognition device to generate an emergency signal. Once the emergency signal is created, it is transmitted 34 by the speech recognition device 45 via a computer network (e.g., Wi-Fi network) to a host computer 21. The host computer 21 receives the emergency signal via the computer network. The host computer is configured by emergency software to interpret the emergency signal and generate an emergency response 37. The emergency response 25 may take any of the forms described previously.

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,526;
U.S. Pat. No. 8,798,367; U.S. Pat. No. 8,807,431;
U.S. Pat. No. 8,807,432; U.S. Pat. No. 8,820,630;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2011/0202554;
U.S. Patent Application Publication No. 2012/0111946;
U.S. Patent Application Publication No. 2012/0138685;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0200158;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0341399;
U.S. Patent Application Publication No. 2013/0342717;
U.S. Patent Application Publication No. 2014/0001267;
U.S. Patent Application Publication No. 2014/0002828;
U.S. Patent Application Publication No. 2014/0008430;
U.S. Patent Application Publication No. 2014/0008439;
U.S. Patent Application Publication No. 2014/0025584;

U.S. Patent Application Publication No. 2014/0027518;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061305;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0075846;
U.S. Patent Application Publication No. 2014/0076974;
U.S. Patent Application Publication No. 2014/0078341;
U.S. Patent Application Publication No. 2014/0078342;
U.S. Patent Application Publication No. 2014/0078345;
U.S. Patent Application Publication No. 2014/0084068;
U.S. Patent Application Publication No. 2014/0097249;
U.S. Patent Application Publication No. 2014/0098792;
U.S. Patent Application Publication No. 2014/0100774;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0108682;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0160329;
U.S. Patent Application Publication No. 2014/0166755;
U.S. Patent Application Publication No. 2014/0166757;
U.S. Patent Application Publication No. 2014/0166759;
U.S. Patent Application Publication No. 2014/0166760;
U.S. Patent Application Publication No. 2014/0166761;
U.S. Patent Application Publication No. 2014/0168787;
U.S. Patent Application Publication No. 2014/0175165;
U.S. Patent Application Publication No. 2014/0175169;
U.S. Patent Application Publication No. 2014/0175172;
U.S. Patent Application Publication No. 2014/0175174;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0203087;
U.S. Patent Application Publication No. 2014/0204268;
U.S. Patent Application Publication No. 2014/0214631;
U.S. Patent Application Publication No. 2014/0217166;
U.S. Patent Application Publication No. 2014/0217180;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/436,337 for an Electronic Device, filed Nov. 5, 2012 (Fitch et al.);
U.S. patent application Ser. No. 13/771,508 for an Optical Redirection Adapter, filed Feb. 20, 2013 (Anderson);
U.S. patent application Ser. No. 13/852,097 for a System and Method for Capturing and Preserving Vehicle Event Data, filed Mar. 28, 2013 (Barker et al.);
U.S. patent application Ser. No. 13/902,110 for a System and Method for Display of Information Using a Vehicle-Mount Computer, filed May 24, 2013 (Hollifield);
U.S. patent application Ser. No. 13/902,144, for a System and Method for Display of Information Using a Vehicle-Mount Computer, filed May 24, 2013 (Chamberlin);
U.S. patent application Ser. No. 13/902,242 for a System For Providing A Continuous Communication Link With A Symbol Reading Device, filed May 24, 2013 (Smith et al.);
U.S. patent application Ser. No. 13/912,262 for a Method of Error Correction for 3D Imaging Device, filed Jun. 7, 2013 (Jovanovski et al.);
U.S. patent application Ser. No. 13/912,702 for a System and Method for Reading Code Symbols at Long Range Using Source Power Control, filed Jun. 7, 2013 (Xian et al.);
U.S. patent application Ser. No. 29/458,405 for an Electronic Device, filed Jun. 19, 2013 (Fitch et al.);
U.S. patent application Ser. No. 13/922,339 for a System and Method for Reading Code Symbols Using a Variable Field of View, filed Jun. 20, 2013 (Xian et al.);
U.S. patent application Ser. No. 13/927,398 for a Code Symbol Reading System Having Adaptive Autofocus, filed Jun. 26, 2013 (Todeschini);
U.S. patent application Ser. No. 13/930,913 for a Mobile Device Having an Improved User Interface for Reading Code Symbols, filed Jun. 28, 2013 (Gelay et al.);
U.S. patent application Ser. No. 29/459,620 for an Electronic Device Enclosure, filed Jul. 2, 2013 (London et al.);
U.S. patent application Ser. No. 29/459,681 for an Electronic Device Enclosure, filed Jul. 2, 2013 (Chaney et al.);
U.S. patent application Ser. No. 13/933,415 for an Electronic Device Case, filed Jul. 2, 2013 (London et al.);
U.S. patent application Ser. No. 29/459,785 for a Scanner and Charging Base, filed Jul. 3, 2013 (Fitch et al.);
U.S. patent application Ser. No. 29/459,823 for a Scanner, filed Jul. 3, 2013 (Zhou et al.);
U.S. patent application Ser. No. 13/947,296 for a System and Method for Selectively Reading Code Symbols, filed Jul. 22, 2013 (Rueblinger et al.);
U.S. patent application Ser. No. 13/950,544 for a Code Symbol Reading System Having Adjustable Object Detection, filed Jul. 25, 2013 (Jiang);
U.S. patent application Ser. No. 13/961,408 for a Method for Manufacturing Laser Scanners, filed Aug. 7, 2013 (Saber et al.);

U.S. patent application Ser. No. 14/018,729 for a Method for Operating a Laser Scanner, filed Sep. 5, 2013 (Feng et al.);

U.S. patent application Ser. No. 14/019,616 for a Device Having Light Source to Reduce Surface Pathogens, filed Sep. 6, 2013 (Todeschini);

U.S. patent application Ser. No. 14/023,762 for a Handheld Indicia Reader Having Locking Endcap, filed Sep. 11, 2013 (Gannon);

U.S. patent application Ser. No. 14/035,474 for Augmented-Reality Signature Capture, filed Sep. 24, 2013 (Todeschini);

U.S. patent application Ser. No. 29/468,118 for an Electronic Device Case, filed Sep. 26, 2013 (Oberpriller et al.);

U.S. patent application Ser. No. 14/055,234 for Dimensioning System, filed Oct. 16, 2013 (Fletcher);

U.S. patent application Ser. No. 14/053,314 for Indicia Reader, filed Oct. 14, 2013 (Huck);

U.S. patent application Ser. No. 14/065,768 for Hybrid System and Method for Reading Indicia, filed Oct. 29, 2013 (Meier et al.);

U.S. patent application Ser. No. 14/074,746 for Self-Checkout Shopping System, filed Nov. 8, 2013 (Hejl et al.);

U.S. patent application Ser. No. 14/074,787 for Method and System for Configuring Mobile Devices via NFC Technology, filed Nov. 8, 2013 (Smith et al.);

U.S. patent application Ser. No. 14/087,190 for Optimal Range Indicators for Bar Code Validation, filed Nov. 22, 2013 (Hejl);

U.S. patent application Ser. No. 14/094,087 for Method and System for Communicating Information in an Digital Signal, filed Dec. 2, 2013 (Peake et al.);

U.S. patent application Ser. No. 14/101,965 for High Dynamic-Range Indicia Reading System, filed Dec. 10, 2013 (Xian);

U.S. patent application Ser. No. 14/150,393 for Indicia-reader Having Unitary Construction Scanner, filed Jan. 8, 2014 (Colavito et al.);

U.S. patent application Ser. No. 14/154,207 for Laser Barcode Scanner, filed Jan. 14, 2014 (Hou et al.);

U.S. patent application Ser. No. 14/165,980 for System and Method for Measuring Irregular Objects with a Single Camera filed Jan. 28, 2014 (Li et al.);

U.S. patent application Ser. No. 14/166,103 for Indicia Reading Terminal Including Optical Filter filed Jan. 28, 2014 (Lu et al.);

U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 14/250,923 for Reading Apparatus Having Partial Frame Operating Mode filed Apr. 11, 2014, (Deng et al.);

U.S. patent application Ser. No. 14/257,174 for Imaging Terminal Having Data Compression filed Apr. 21, 2014, (Barber et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/274,858 for Mobile Printer with Optional Battery Accessory filed May 12, 2014 (Marty et al.);

U.S. patent application Ser. No. 14/277,337 for MULTIPURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/300,276 for METHOD AND SYSTEM FOR CONSIDERING INFORMATION ABOUT AN EXPECTED RESPONSE WHEN PERFORMING SPEECH RECOGNITION, filed Jun. 10, 2014 (Braho et al.);

U.S. patent application Ser. No. 14/305,153 for INDICIA READING SYSTEM EMPLOYING DIGITAL GAIN CONTROL filed Jun. 16, 2014 (Xian et al.);

U.S. patent application Ser. No. 14/310,226 for AUTOFOCUSING OPTICAL IMAGING DEVICE filed Jun. 20, 2014 (Koziol et al.);

U.S. patent application Ser. No. 14/327,722 for CUSTOMER FACING IMAGING SYSTEMS AND METHODS FOR OBTAINING IMAGES filed Jul. 10, 2014 (Oberpriller et al);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/329,303 for CELL PHONE READING MODE USING IMAGE TIMER filed Jul. 11, 2014 (Coyle);

U.S. patent application Ser. No. 14/333,588 for SYMBOL READING SYSTEM WITH INTEGRATED SCALE BASE filed Jul. 17, 2014 (Barten);

U.S. patent application Ser. No. 14/334,934 for a SYSTEM AND METHOD FOR INDICIA VERIFICATION, filed Jul. 18, 2014 (Hejl);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/340,716 for an OPTICAL IMAGER AND METHOD FOR CORRELATING A MEDICATION PACKAGE WITH A PATIENT, filed Jul. 25, 2014 (Ellis);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/345,735 for Optical Indicia Reading Terminal with Combined Illumination filed Mar. 19, 2014 (Ouyang);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/355,613 for Optical Indicia Reading Terminal with Color Image Sensor filed May 1, 2014 (Lu et al.);

U.S. patent application Ser. No. 14/370,237 for WEB-BASED SCAN-TASK ENABLED SYSTEM AND METHOD OF AND APPARATUS FOR DEVELOPING AND DEPLOYING THE SAME ON A CLIENT-SERVER NETWORK filed Jul. 2, 2014 (Chen et al.);

U.S. patent application Ser. No. 14/370,267 for INDUSTRIAL DESIGN FOR CONSUMER DEVICE BASED SCANNING AND MOBILITY, filed Jul. 2, 2014 (Ma et al.);

U.S. patent application Ser. No. 14/376,472, for an ENCODED INFORMATION READING TERMINAL INCLUDING HTTP SERVER, filed Aug. 4, 2014 (Lu);

U.S. patent application Ser. No. 14/379,057 for METHOD OF USING CAMERA SENSOR INTERFACE TO TRANSFER MULTIPLE CHANNELS OF SCAN DATA USING AN IMAGE FORMAT filed Aug. 15, 2014 (Wang et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/460,387 for APPARATUS FOR DISPLAYING BAR CODES FROM LIGHT EMITTING DISPLAY SURFACES filed Aug. 15, 2014 (Van Horn et al.);

U.S. patent application Ser. No. 14/460,829 for ENCODED INFORMATION READING TERMINAL WITH WIRELESS PATH SELECTION CAPABILITY, filed Aug. 15, 2014 (Wang et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/446,387 for INDICIA READING TERMINAL PROCESSING PLURALITY OF FRAMES OF IMAGE DATA RESPONSIVELY TO TRIGGER SIGNAL ACTIVATION filed Jul. 30, 2014 (Wang et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 29/486,759 for an Imaging Terminal, filed Apr. 2, 2014 (Oberpriller et al.);

U.S. patent application Ser. No. 29/492,903 for an INDICIA SCANNER, filed Jun. 4, 2014 (Zhou et al.); and U.S. patent application Ser. No. 29/494,725 for an IN-COUNTER BARCODE SCANNER, filed Jun. 24, 2014 (Oberpriller et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A safety system comprising;
an emergency sign comprising a machine-readable emergency symbol;
an indicia reader to decode the emergency symbol and generate an emergency signal comprising instructions for an emergency response, the indicia reader communicatively coupled to a computer network; and
a host computer communicatively coupled to the computer network configured to receive the emergency signal and initiate the emergency response.

2. The safety system according to claim 1, wherein the emergency symbol is encoded using Automatic Identification and Mobility (AIM) Extended Channel Interpretations (ECI) methodologies.

3. The safety system according to claim 1, wherein the emergency signal comprises an emergency location indicator (ELI) that provides information regarding the location of the emergency sign.

4. The safety system according to claim 3, wherein the emergency location indicator (ELI) is GPS coordinates.

5. The safety system according to claim 3, wherein the emergency location indicator (ELI) is a grid location address.

6. The safety system according to claim 1, wherein the emergency response is an email.

7. The safety system according to claim 1, wherein the emergency response is a text message.

8. The safety system according to claim 1, wherein the emergency response is an audible alarm.

9. The safety system according to claim 1, wherein the emergency response is a voice message sent via an auto-dialed phone connection.

10. The safety system according to claim 1, wherein the emergency response is an alarm signal transmitted to a facility security system and is one of a plurality of possible alarm inputs to the facility security system.

11. The safety system according to claim 1, wherein the readable message comprises the word emergency.

12. The safety system according to claim 1, wherein the indicia reader is a smartphone.

13. A method for generating an emergency response using an emergency symbol, the method comprising:
locating an emergency sign comprising a machine-readable emergency symbol comprising instructions for generating an emergency response;
scanning the emergency symbol with an indicia reader communicatively coupled to a computer network;
decoding the emergency symbol;
generating an emergency signal using the decoded information; and
transmitting the emergency signal from the indicia reader to a host computer communicatively coupled to the network and running emergency software, wherein the host computer is configured by the emergency software to (i) interpret the emergency signal and (ii) initiate the emergency response.

14. The method according to claim 13, wherein the emergency symbol is encoded using Automatic Identification and Mobility (AIM) Extended Channel Interpretations (ECI) methodologies.

15. The method according to claim 13, wherein the emergency signal comprises GPS coordinates corresponding to the emergency sign's location.

16. The method according to claim 13, wherein the emergency response comprises a text message or email.

17. The method according to claim 13, wherein the emergency response comprises a telephone call.

18. The method according to claim 13, wherein the indicia reader is a smartphone.

19. A method for generating an emergency response using an emergency symbol printed on an emergency sign, the method comprising:
locating an emergency sign comprising a machine-readable emergency symbol including instructions for an emergency response;

reading and decoding the emergency symbol with an indicia reader communicatively coupled to a computer network;

generating, with the indicia reader, an emergency signal including instructions for an emergency response using the decoded information from the emergency symbol; and transmitting the emergency signal from the indicia reader to a host computer communicatively connected to the network; and receiving the emergency response from the host computer, the host computer configured to, upon receiving the emergency signal, (i) interpret the emergency signal, (ii) generate the emergency response, and (iii) transmit the emergency response to the indicia reader.

20. The method of claim 19, wherein the emergency response comprises one or more of: a text message, an email, and a telephone call.

* * * * *